US012292273B2

(12) United States Patent
Chen et al.

(10) Patent No.: US 12,292,273 B2
(45) Date of Patent: May 6, 2025

(54) DEVICE AND METHOD FOR SENSING DEPTH

(71) Applicant: HIMAX TECHNOLOGIES LIMITED, Tainan (TW)

(72) Inventors: Wu-Feng Chen, Tainan (TW); Ching-Wen Wang, Tainan (TW); Cheng Che Tsai, Tainan (TW); Hsueh-Tsung Lu, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 300 days.

(21) Appl. No.: 17/931,132

(22) Filed: Sep. 11, 2022

(65) Prior Publication Data
US 2024/0085172 A1  Mar. 14, 2024

(51) Int. Cl.
*G01B 11/22* (2006.01)
(52) U.S. Cl.
CPC .................. *G01B 11/22* (2013.01)

(58) Field of Classification Search
CPC ..................... G01B 11/22; G01B 11/2513
See application file for complete search history.

(56) References Cited

U.S. PATENT DOCUMENTS

2021/0201519 A1* 7/2021 Nash ............... G01B 11/2513
2022/0383476 A1* 12/2022 Varekamp ........ H04N 21/21805

* cited by examiner

*Primary Examiner* — Michelle M Iacoletti
*Assistant Examiner* — Sebastian A Arnez
(74) *Attorney, Agent, or Firm* — CKC & Partners Co., LLC

(57) ABSTRACT

The device includes a projecting device, an image sensor and a computing circuit. The projecting device provides a light beam having a predetermined pattern that is projected onto an object. The image sensor receives the light beam reflected from the object to generate an image. The computing circuit compares the image with a first ground-truth image and a ground-truth image to generate a first depth value and a second depth value respectively. The first and second depth values are combined to generate a depth result.

16 Claims, 5 Drawing Sheets

DEVICE AND METHOD FOR SENSING DEPTH

BACKGROUND

Field of Invention

The present disclosure relates to a device and a method for sensing depths by using multiple ground-truth images.

Description of Related Art

The depth sensing technology of structured light is to project a specific pattern onto an object, then capture an image and determine the displacement of the pattern to calculate the depth. The pattern may include multiple dots which can be generated through a diffractive optical element (DOE). The pattern needs to be projected multiple times to generate a sufficient number of the dots. However, there may be a slight error between the multiple projections, which lead to an error in the calculated depth value. Referring to FIG. 1, a plane is sensed, but the calculated depth values are not consistent due to the error, resulting in vertical stripes in the depth image 100. It is shown that the inconsistent depths occur in the horizontal direction but not the vertical direction because the vertical error of the DOE does not affect the depth calculation.

SUMMARY

Embodiments of the present disclosure provide a device including a projecting device, an image sensor and a computing circuit. The projecting device provides a light beam having a predetermined pattern that is projected onto an object. The image sensor receives the light beam reflected from the object to generate a first image. The computing circuit is electrically connected to the image sensor and configured to compare the first image with a first ground-truth image to calculate a first depth value. The first ground-truth image is generated by projecting the predetermined pattern onto a preset object at a first distance from the device. The computing circuit is configured to compare the first image with a second ground-truth image to calculate a second depth value. The second ground-truth image is generated by projecting the predetermined pattern onto the preset object at a second distance from the device, and the second distance is different from the first distance. The computing circuit is configured to combine the first depth value and the second depth value to generate a depth result.

In some embodiments, the first distance is less than the second distance, the computing circuit is configured to compare one of the first depth value and the second depth value with the first distance. When the one of the first depth value and the second depth value is less than or equal to the first distance, the computing circuit is configured to output the first depth value as the depth result.

In some embodiments, when the one of the first depth value and the second depth value is greater than the first distance and less than the second distance, the computing circuit is configured to calculate a weighting sum of the first depth value and the second depth value as the depth result.

In some embodiments, the computing circuit is configured to determine a first weight of the first depth value according to a difference value between the first depth value and the first distance, in which the first weight is negatively correlated with the difference value.

In some embodiments, a sum of the first weight and a second weight of the second depth value is equal to a constant.

In some embodiments, when the one of the first depth value and the second depth value is greater than or equal to the second distance, the computing circuit is configured to output the second depth value as the depth result.

In some embodiments, when one of the first depth value and the second depth value indicates a decoding error, the computing circuit is configured to output another of the first depth value and the second depth value as the depth result.

In some embodiments, when a depth difference between the first depth value and the second depth value is greater than a threshold, the computing circuit is configured to set the depth result to be a noise.

From another aspect, embodiments of the present disclosure provide a method for a computing circuit. The method including: providing, by a projecting device, a light beam having a predetermined pattern that is projected onto an object; receiving, by an image sensor, the light beam reflected from the object to generate a first image; comparing the first image with a first ground-truth image to calculate a first depth value, in which the first ground-truth image is generated by projecting the predetermined pattern onto a preset object at a first distance from the image sensor; comparing the first image with a second ground-truth image to calculate a second depth value, in which the second ground-truth image is generated by projecting the predetermined pattern onto the preset object at a second distance from the image sensor, and the second distance is different from the first distance; and combining the first depth value and the second depth value to generate a depth result.

In some embodiments, the first distance is less than the second distance. The step of combining the first depth value and the second depth value to generate the depth result includes: comparing one of the first depth value and the second depth value with the first distance; and outputting the first depth value as the depth result when the one of the first depth value and the second depth value is less than or equal to the first distance.

In some embodiments, the step of combining the first depth value and the second depth value to generate the depth result further includes: calculate a weighting sum of the first depth value and the second depth value as the depth result when the one of the first depth value and the second depth value is greater than the first distance and less than the second distance.

In some embodiments, further including: determining a first weight of the first depth value according to a difference value between the first depth value and the first distance, in which the first weight is negatively correlated with the difference value.

In some embodiments, the step of combining the first depth value and the second depth value to generate the depth result further includes: outputting the second depth value as the depth result when the one of the first depth value and the second depth value is greater than or equal to the second distance.

In some embodiments, the step of combining the first depth value and the second depth value to generate the depth result includes: when one of the first depth value and the second depth value indicates a decoding error, outputting another of the first depth value and the second depth value as the depth result.

In some embodiments, the step of combining the first depth value and the second depth value to generate the depth result includes: when a depth difference between the first depth value and the second depth value is greater than a threshold, setting the depth result to be a noise.

BRIEF DESCRIPTION OF THE DRAWINGS

The invention can be more fully understood by reading the following detailed description of the embodiment, with reference made to the accompanying drawings as follows.

DETAILED DESCRIPTION

Specific embodiments of the present invention are further described in detail below with reference to the accompanying drawings, however, the embodiments described are not intended to limit the present invention and it is not intended for the description of operation to limit the order of implementation. Moreover, any device with equivalent functions that is produced from a structure formed by a recombination of elements shall fall within the scope of the present invention. Additionally, the drawings are only illustrative and are not drawn to actual size.

The using of "first", "second", "third", etc. in the specification should be understood for identifying units or data described by the same terminology, but are not referred to particular order or sequence.

Figure 1:
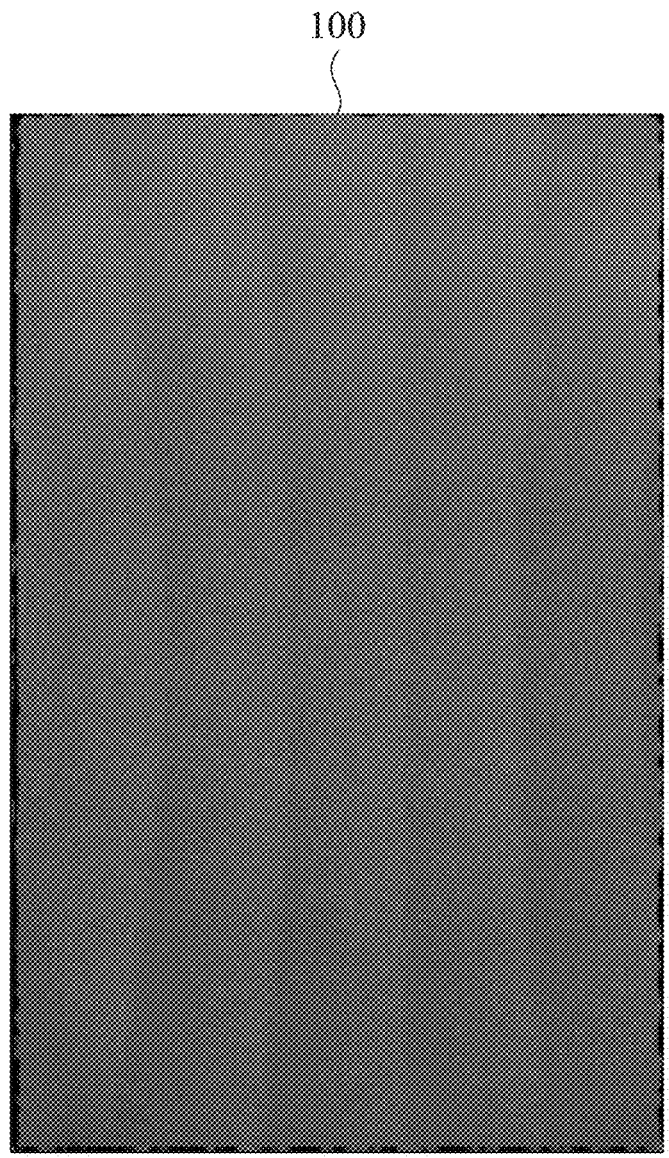
FIG. 1 is a diagram illustrating a depth image generated by prior art.
Figure 2:
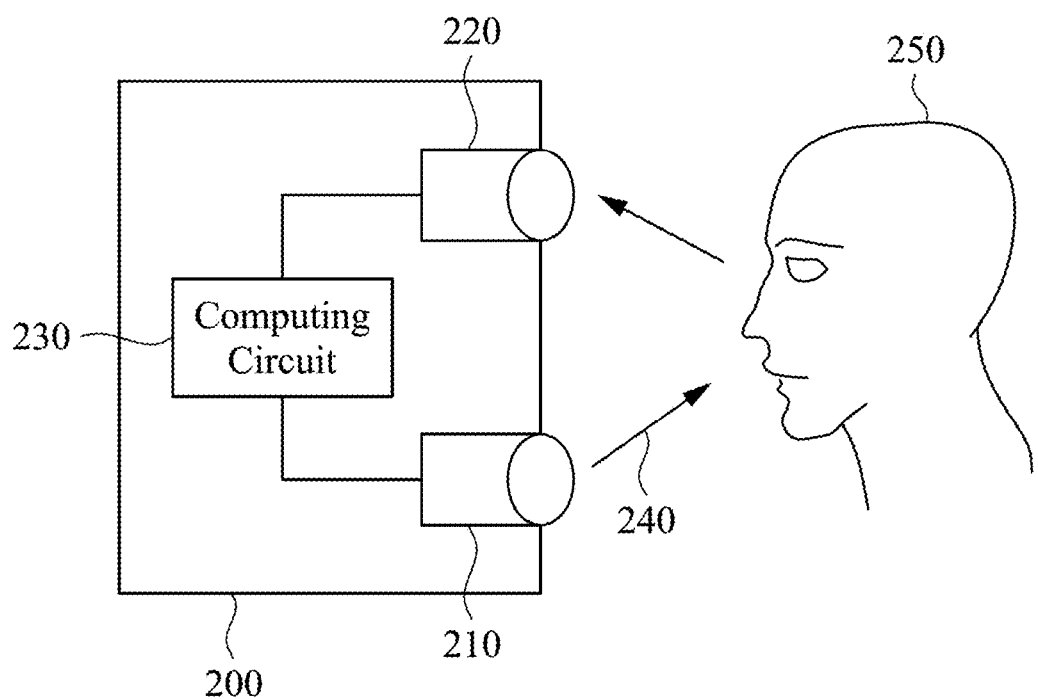
FIG. 2 is a schematic diagram of a device for sensing depths in accordance with an embodiment.

FIG. 2 is a schematic diagram of a device for sensing depths in accordance with an embodiment. Referring to FIG. 2, a depth sensing device 200 includes a projecting device 210, an image sensor 220, and a computing circuit 230. The depth sensing device 200 may be a smart phone, a notebook computer, or any suitable electrical device.

The projecting device 210 includes a light source and an optical element. The light source is, for example, a light-emitting unit or a laser unit such as an Edge Emitting Laser (EEL), a Vertical Cavity Surface Emitting Laser (VCSEL), or a photonic crystal surface emitting laser (OCSEL) which is not limited in the disclosure. A light beam provided by the light source is infrared light in some embodiments, but the wavelength of the light beam is not limited in the disclosure. The optical element applies a predetermined pattern to the light beam. For example, the optical element is a Diffractive Optical Element (DOE) or a liquid crystal lens based on Liquid Crystal on Silicon (LCOS). The image sensor 220 may include a Charge-Coupled Device (CCD) sensor, a Complementary Metal-Oxide Semiconductor (COMS) sensor or any other suitable optical sensor. The image sensor 220 can sense visible light or invisible light which is not limited in the disclosure. The computing circuit 230 is electrically connected to the projecting device 210 and image sensor 220. The computing circuit 230 may be a central processing unit, a microprocessor, a microcontroller, an Application Specific Integrated Circuit (ASIC), or any circuit with computation ability.

The projecting device 210 provides a light beam 240 having the predetermined pattern. The light beam 240 is projected onto an object 250. In some embodiments, the predetermined pattern includes multiple dots, but the predetermined pattern may include stripes or other patterns in other embodiments. In the embodiment, the object 250 is a face but the disclosure is not limited thereto. The image sensor 220 receives the light beam reflected from the object 250 so as to generate an image. The computing circuit 230 performs a depth sensing method to calculate a depth result according to the image and multiple ground-truth images. The method will be described in detail below.

Figure 3:
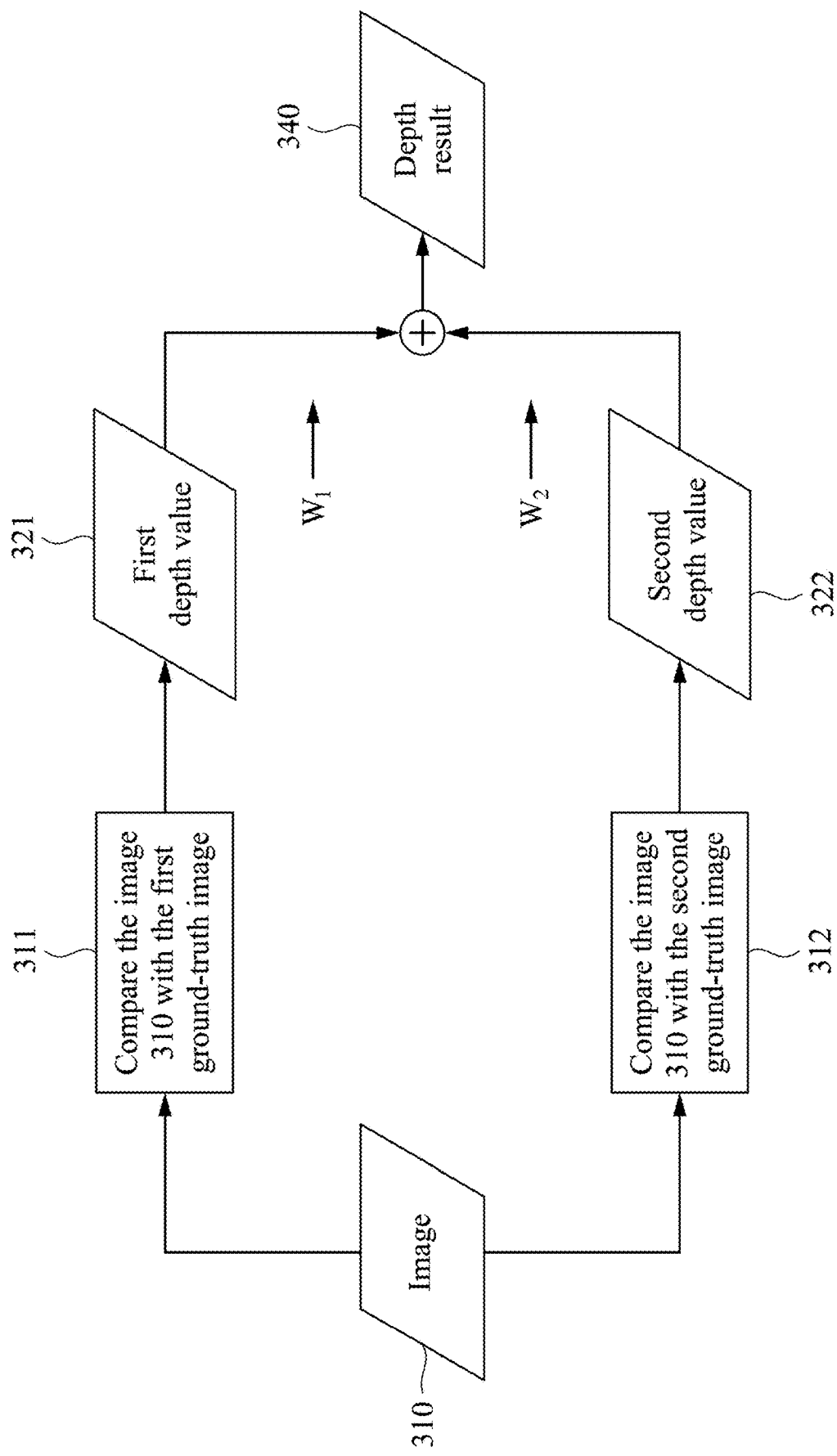
FIG. 3 is a flow chart of the depth sensing method in accordance with an embodiment.

FIG. 3 is a flow chart of the depth sensing method in accordance with an embodiment. Referring to FIG. 3, an image 310 is received from the image sensor 220. In step 311, the image 310 is compared with a first ground-truth image to calculate a first depth value 321. The first ground-truth image is generated by projecting the predetermined pattern onto a preset object at a first distance from the depth sensing device 200 (equal to the distance from the image sensor 220). The first distance is 30, 50, or 80 centimeters (cm) which are not limited in the disclosure. The preset object is, for example a plane which is not limited in the disclosure. In detail, the preset object is disposed at the first distance in advance, and the light beam having the predetermined pattern (including dots) is projected onto the object, and then the reflected light beam is captured by the image sensor 220 to generate the first ground-truth image. When comparing the image 310 and the first ground-truth image, a block is set to include several dots which are distributed randomly, and therefore the distribution of the dots in each block is unique. After finding a matched block, a displacement of each dot in the block is obtained to calculate a depth value. If the displacement is equal to zero, then the first depth value 321 is equal to the first distance; if the displacement is positive (or negative), then the first depth value 321 is greater than (or less than) the first distance. People in art should be able to calculate the depth value according to any suitable computer vision algorithm which is not limited in the disclosure.

In step 312, the image 310 is compared with a second ground-truth image to calculate a second depth value 322. The second ground-truth image is generated by projecting the predetermined pattern onto the preset object at a second distance from the depth sensing device 200. In particular, the second distance is different from the first distance. The calculation of the second depth value 322 is similar to that of the first depth value 321, and therefore the description will not be repeated.

Figure 4:
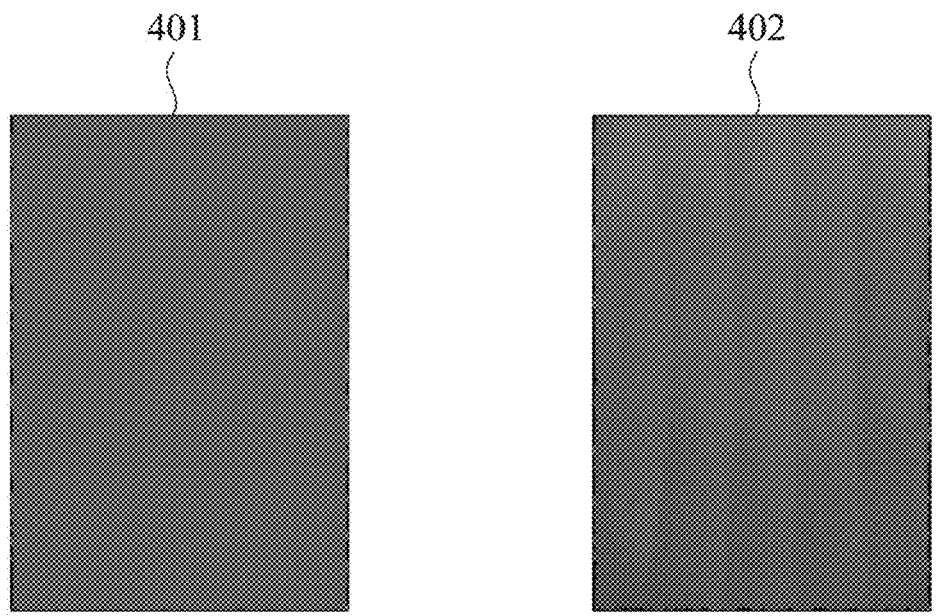
FIG. 4 and FIG. 5 are diagrams illustrating the first depth values and the second depth values that are sensed at different distances.
Figure 5:
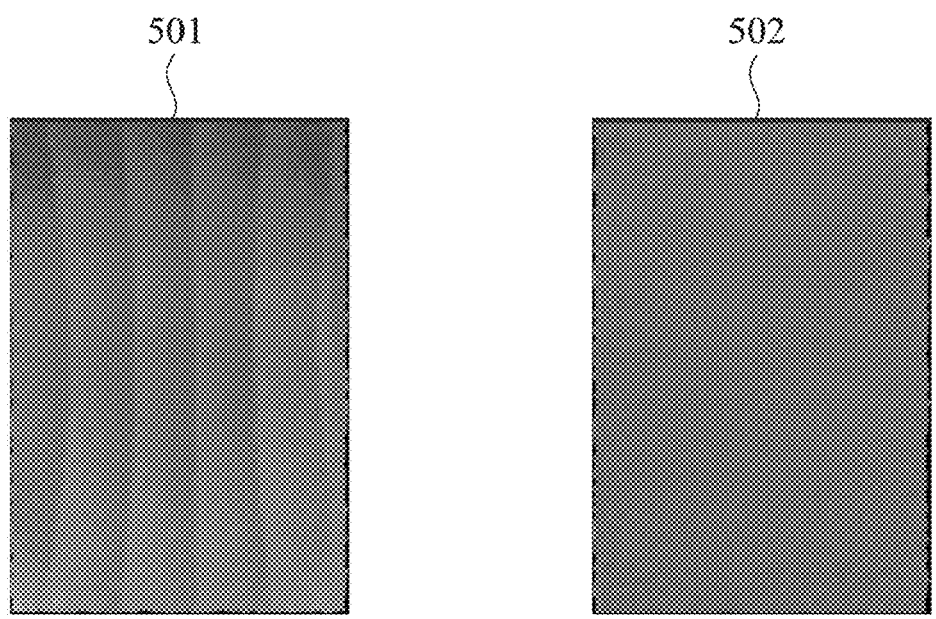

When the object to be sensed is disposed around the first distance, the accuracy of the first depth value 321 is relatively higher; and when the object is disposed around the second distance, the accuracy of the second depth value 322 is relatively higher. For example, FIG. 4 and FIG. 5 are diagrams illustrating the first depth values and the second depth values that are sensed at different distances. In FIG. 4, the object is disposed at the first distance. After calculating the first depth value of each pixel, the first depth values constitute a depth image 401. Similarly, the second depth values of all pixels constitute a depth image 402. It is shown that the depth image 401 does not include stripes, but the depth image 402 does. In FIG. 5, the object is disposed at the second distance, the first depth values constitute a depth image 501, and the second depth values constitute a depth image 502. It is shown that the depth image 501 includes vertical stripes, but the depth image 502 does not.

Referring to FIG. 3, the first depth value 321 and the second depth value 322 are combined to generate a depth result 340. In brief, when the sensed depth value is between the first distance and the second distance, a weighting sum is calculated as the depth result 340, otherwise one of the depth values is taken as the depth result 340. For example, the first distance is 30 cm and the second distance is 80 cm in which the first distance is less than the second distance. The first depth value 321 or the second depth value 322 is taken as a basis for the following comparison. The first depth value 321 is taken as the basis in the embodiment, but the second depth value 322 may be taken as the basis in other embodiments. When first depth value 321 is less than or equal to the first distance, the first depth value 321 is outputted as the depth result 340. When the first depth value 321 is greater than or equal to the second distance, the second depth value 322 is outputted as the depth result 340. If the first depth value 321 is greater than the first distance and less than the second distance, a weighting sum of the first depth value 321 and the second depth value 322 is calculated as the depth result 340. A first weight $W_1$ is assigned to the first depth value 321, and a second weight $W_2$ is assigned to the second depth value 322. The weighting sum is written in the following Equation 1.

$$d_r = W_1 \times d_1 + W_2 \times d_2 \quad \text{[Equation 1]}$$
$$W_1 + W_2 = 1$$

In the equation, $d_r$ is the depth result 340, $d_1$ is the first depth value 321, and $d_2$ is the second depth value 322. In other words, the sum of the first weight $W_1$ and the second weight $W_2$ is equal to a constant (e.g. 1). In some embodiments, the first weight $W_1$ is determined according to a difference value between the first depth value 331 and the first distance, such that the first weight $W_1$ is negatively correlated to the difference value. For example, the calculation of the first weight $W_1$ is written in the following Equation 2.

$$W_1 = 1 - \frac{d_1 - D_1}{D_2 - D_1} = \frac{D_2 - d_1}{D_2 - D_1} \quad \text{[Equation 2]}$$

$D_1$ is the first distance. $D_2$ is the second distance. When the first depth value $d_1$ is close to the first distance $D_1$, the difference value ($d_1-D_1$) is relatively small that leads to the grate first weight $W_1$. A linear function is adopted in the Equation 2 for calculating the first weight $W_1$, but a non-linear function may be adopted such as the following Equation 3 in other embodiments.

$$W_1 = \frac{e^{-(D_2-d_1)}}{e^{-(d_1-D_1)} + e^{-(D_2-d_1)}} \quad \text{[equation 3]}$$

Figure 6:
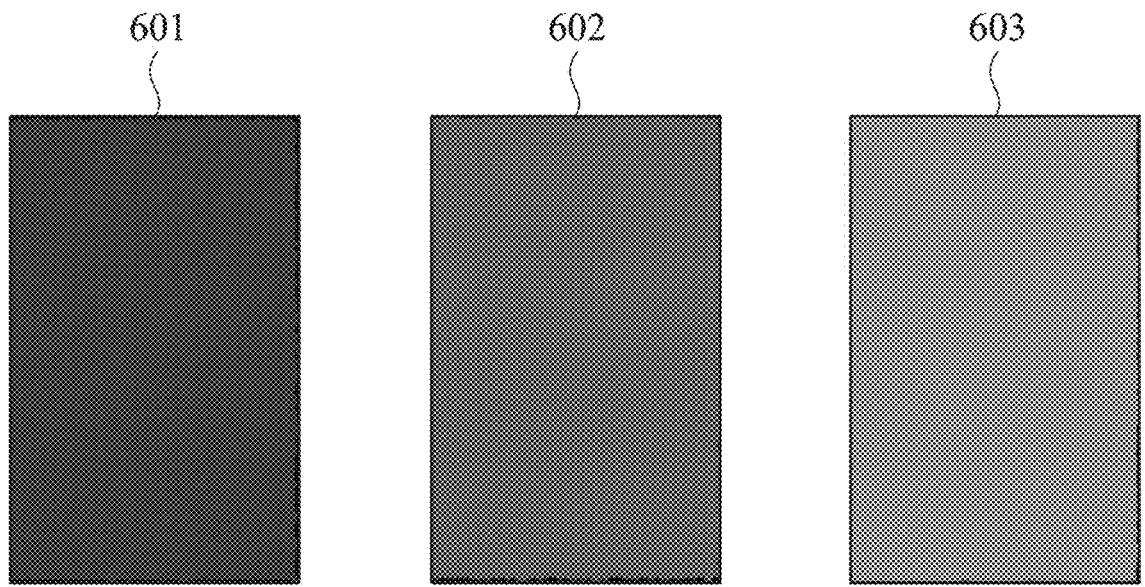
FIG. 6 is a diagram illustrating the depth result at different distances in accordance with an embodiment.

FIG. 6 is a diagram illustrating the depth result at different distances in accordance with an embodiment. Referring to FIG. 6, based on the aforementioned method, a depth image 601 is generated when the object is disposed at a close distance; a depth image 602 is generated when the object is disposed at a medium distance; and a depth image 603 is generated when the object is disposed at a long distance. It is shown that regardless of the distances, all the depth images 601-603 do not include vertical stripes.

Figure 7:
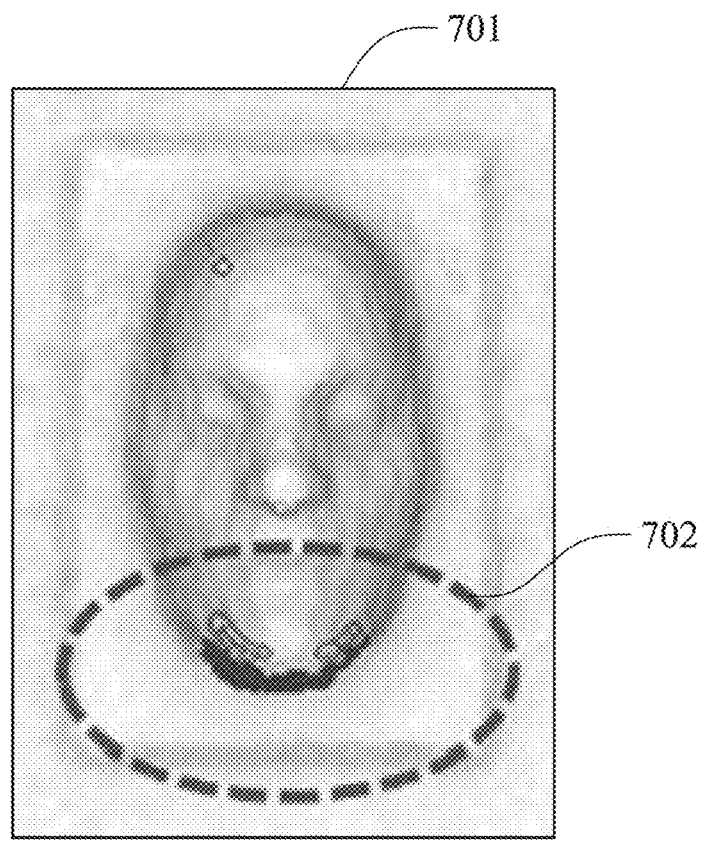
FIG. 7 is a diagram for illustrating the decoding error in accordance with an embodiment.

As mentioned above, a block includes multiple dots when comparing the images. Due to diverse depth values, the block may not be decoded successfully and leads to a decoding error. In some embodiments, a degree of difference among the depth values in each block is calculated. If the degree of difference is greater than a threshold, it means the corresponding block is not decoded successfully. In some embodiment, a clustering algorithm (e.g. k-means algorithm or other suitable clustering algorithm) is performed to the depth values in the same block (e.g. into two groups). Then, a difference between two centroids of the two groups is calculated as the degree of difference. In some embodiments, a standard deviation (or variance) of the depth values in the same block is calculated as the degree of difference. In some embodiments, a sum of absolute difference between each depth value and a mean of the depth values is calculated as the degree of difference. In some embodiments, a median or a mode of the depth values in the same block is calculated, and then a number of the depth values that differed from the median (or the mode) more than a threshold is calculated as the degree of difference. People in the skilled art should be able to devise another degree of difference based on the disclosure. In principle, a large degree of difference indicates inconsistent depth values in the same block, which means that the object may have an edge, a notch, a bump, a reflecting region, an absorbing region, etc. In the embodiments, if the decoding error occurs, then the depth value is set to be a predetermined value (e.g. 0) which is not suitable for calculating the weighting sum and therefore can be abandoned. To be specific, if one of the first depth value 321 and the second depth value 322 indicates the decoding error and the other depth value indicates decoding success, and the depth value which is decoded successfully is outputted as the depth result 340. If both of the first depth value 321 and the second depth value 322 indicate the decoding error, then the depth result 340 is set to be the decoding error. FIG. 7 is a diagram for illustrating the decoding error in accordance with an embodiment. Referring to FIG. 7, a depth image 701 is about a face, dots are projected onto the jaw in a region 702 where black dots represent the pixels having at least one decoding error. There are two depth values for each pixel in the embodiments, and therefore it is more likely to obtain the depth value which is decoded successfully.

In some embodiments, it is determined whether a depth difference between the first depth value 321 and the second depth value 322 is greater than a threshold. If the determination is yes, it means the decoding result may not be trusted, and then the depth result 340 is set to be a noise.

Two ground-truth images are used in the embodiment, but more ground-truth images may be used in other embodiments. Due to multiple ground-truth images, the method and the device generate the depth image not including vertical stripes in addition to remove noises and address the problem of decoding error.

Although the present invention has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A device comprising:
a projecting device configured to provide a light beam having a predetermined pattern that is projected onto an object;
an image sensor configured to receive the light beam reflected from the object to generate a first image; and
a computing circuit electrically connected to the image sensor and configured to compare the first image with a first ground-truth image to calculate a first depth value, wherein the first ground-truth image is generated by projecting the predetermined pattern onto a preset object at a first distance from the device,
wherein the computing circuit is configured to compare the first image with a second ground-truth image to calculate a second depth value, wherein the second ground-truth image is generated by projecting the predetermined pattern onto the preset object at a second distance from the device, and the second distance is different from the first distance,
wherein the computing circuit is configured to combine the first depth value and the second depth value to generate a depth result.

2. The device of claim 1, wherein the first distance is less than the second distance, the computing circuit is configured to compare one of the first depth value and the second depth value with the first distance,
wherein the computing circuit is configured to output the first depth value as the depth result in response to the one of the first depth value and the second depth value being less than or equal to the first distance.

3. The device of claim 2, wherein the computing circuit is configured to calculate a weighting sum of the first depth value and the second depth value as the depth result in response to the one of the first depth value and the second depth value being greater than the first distance and less than the second distance.

4. The device of claim 3, wherein the computing circuit is configured to determine a first weight of the first depth value according to a difference value between the first depth value and the first distance, wherein the first weight is negatively correlated with the difference value.

5. The device of claim 4, wherein a sum of the first weight and a second weight of the second depth value is equal to a constant.

6. The device of claim 3, wherein the computing circuit is configured to output the second depth value as the depth result in response to the one of the first depth value and the second depth value being greater than or equal to the second distance.

7. The device of claim 1, wherein the computing circuit is configured to output another of the first depth value and the second depth value as the depth result in response to one of the first depth value and the second depth value indicating a decoding error.

8. The device of claim 1, wherein the computing circuit is configured to set the depth result to be a noise in response to a depth difference between the first depth value and the second depth value being greater than a threshold.

9. A method for a computing circuit, the method comprising:
providing, by a projecting device, a light beam having a predetermined pattern that is projected onto an object;
receiving, by an image sensor, the light beam reflected from the object to generate a first image;
comparing the first image with a first ground-truth image to calculate a first depth value, wherein the first ground-truth image is generated by projecting the predetermined pattern onto a preset object at a first distance from the image sensor;
comparing the first image with a second ground-truth image to calculate a second depth value, wherein the second ground-truth image is generated by projecting the predetermined pattern onto the preset object at a second distance from the image sensor, and the second distance is different from the first distance; and
combining the first depth value and the second depth value to generate a depth result.

10. The method of claim 9, wherein the first distance is less than the second distance, the step of combining the first depth value and the second depth value to generate the depth result comprises:
comparing one of the first depth value and the second depth value with the first distance; and
outputting the first depth value as the depth result in response to the one of the first depth value and the second depth value being less than or equal to the first distance.

11. The method of claim 10, wherein the step of combining the first depth value and the second depth value to generate the depth result further comprises:
calculate a weighting sum of the first depth value and the second depth value as the depth result in response to the one of the first depth value and the second depth value being greater than the first distance and less than the second distance.

12. The method of claim 11, further comprising:
determining a first weight of the first depth value according to a difference value between the first depth value and the first distance, wherein the first weight is negatively correlated with the difference value.

13. The method of claim 12, wherein a sum of the first weight and a second weight of the second depth value is equal to a constant.

14. The method of claim 11, wherein the step of combining the first depth value and the second depth value to generate the depth result further comprises:
outputting the second depth value as the depth result in response to the one of the first depth value and the second depth value being greater than or equal to the second distance.

15. The method of claim 9, wherein the step of combining the first depth value and the second depth value to generate the depth result comprises:
outputting another of the first depth value and the second depth value as the depth result in response to one of the first depth value and the second depth value indicating a decoding error.

16. The method of claim 9, wherein the step of combining the first depth value and the second depth value to generate the depth result comprises:
setting the depth result to be a noise in response to a depth difference between the first depth value and the second depth value being greater than a threshold.

* * * * *